United States Patent
Magg et al.

(10) Patent No.: US 8,418,601 B2
(45) Date of Patent: Apr. 16, 2013

(54) DEVICE AND METHOD FOR CONTROLLING HEATING PROCESSES

(75) Inventors: Johann Magg, St. Georgen (DE); Andreas Mayr, Breitbrunn am Chiemsee (DE); Markus Obermaier, Nußdorf (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 673 days.

(21) Appl. No.: 10/586,693

(22) PCT Filed: Jan. 24, 2005

(86) PCT No.: PCT/EP2005/050290
§ 371 (c)(1),
(2), (4) Date: Sep. 8, 2008

(87) PCT Pub. No.: WO2005/072575
PCT Pub. Date: Aug. 11, 2005

(65) Prior Publication Data
US 2009/0000488 A1    Jan. 1, 2009

(30) Foreign Application Priority Data
Jan. 30, 2004 (DE) .......................... 10 2004 004 817

(51) Int. Cl.
*A47J 31/047* (2006.01)
(52) U.S. Cl.
USPC ................... 99/281; 99/275; 99/279; 99/280; 99/282; 99/283; 99/285; 219/490; 219/491; 219/492; 219/493; 219/494
(58) Field of Classification Search ............ 99/275, 99/279, 280, 281, 282, 283, 285; 219/490–494; 122/14.1, 14.22; 702/1, 127, 130, 182, 189; 73/432.1, 865.8, 865.9; 700/240; 392/465–466, 392/471–480
See application file for complete search history.

(56) References Cited

U.S. PATENT DOCUMENTS

| | | | |
|---|---|---|---|
| 4,253,385 A | 3/1981 | Illy | |
| 5,083,504 A | 1/1992 | Koga et al. | |

(Continued)

FOREIGN PATENT DOCUMENTS

| | | |
|---|---|---|
| DE | 102 26 656 | 1/2004 |
| EP | 0 380 947 | 8/1990 |

(Continued)

OTHER PUBLICATIONS

Coffee for Connoisseurs, Inside Domestic Espresso Machines, Jul. 2002, http://www.coffeeco.com.au/articles/july2002.html.*

(Continued)

*Primary Examiner* — Henry Yuen
*Assistant Examiner* — Brett Spurlock
(74) *Attorney, Agent, or Firm* — James E. Howard; Andre Pallapies

(57) ABSTRACT

A method for controlling heating processes in a coffee machine which is particularly suitable for preparing coffee on the basis of coffee pads. The coffee machine comprises a continuous flow heater and a pump used to convey water through the continuous flow heater. According to the inventive method, the temperature is measured in the region of the continuous flow heater and/or water which is conveyed by the pump. In order to avoid steam overpressure and to ensure a sufficient, constant temperature during the entire steeping process, the amount of water which is conveyed by the pump is influenced according to temperature. The invention also relates to an electronic control device.

14 Claims, 4 Drawing Sheets

U.S. PATENT DOCUMENTS

| | | | |
|---|---|---|---|
| 5,417,152 A * | 5/1995 | Harrison | 99/492 |
| 5,738,001 A * | 4/1998 | Liverani | 99/283 |
| 5,992,298 A | 11/1999 | Illy et al. | |
| 2003/0066431 A1 | 4/2003 | Fanzutti et al. | |

FOREIGN PATENT DOCUMENTS

| | | |
|---|---|---|
| EP | 0 771 542 | 5/1997 |
| EP | 0 935 938 | 8/1999 |

OTHER PUBLICATIONS

Coffee for Connoisseurs, Sunbeam EM6900 Twin Thermoblock Espresso Machine, Jul. 2002, http://www.coffeeco.com.au/articles/sunbeam.html.*

International Search Report PCT/EP2005/050290.

\* cited by examiner

DEVICE AND METHOD FOR CONTROLLING HEATING PROCESSES

BACKGROUND OF THE INVENTION

The invention relates to a method for controlling heating processes in a coffee machine and an electronic control device.

Coffee machines in the prior art operate according to different principles. The most common models are the so-called pressureless coffee machines. In these water flows from a storage container into an electrically heatable pipe. Particularly as a result of the evolution of steam in this pipe, heated water is then pressed through a riser to an outlet via which the heated water then drips into a coffee filter. The filter coffee can then flow from this coffee filter at atmospheric pressure into a pot.

In contrast, in espresso machines an elevated pressure prevails in the area of the coffee grounds, for example 15 bar. This is achieved by supplying water from a water container or another water supply to an electric-motor-driven pump which then supplies the water at high pressure via an electrically heatable area to a coffee grounds receiving device. This coffee grounds receiving device generally comprises a filter for receiving the coffee. In order to generate the high pressure in the coffee area, during operation the coffee grounds receiving device is located in an area which is sealed towards the atmosphere, which can be designated as a pressure chamber or brewing chamber.

In another coffee machine which operates in a different principle, it is provided to first transfer the water for preparing the coffee from a water container into a heatable intermediate container. From this intermediate chamber the heated water is passed to an electric-motor-driven pump from which it is supplied at elevated pressure, for example 2 to 3 bar, to a coffee grounds receiving device. In this case, it is provided that unlike in the espresso machine the coffee is not introduced into the coffee grounds receiving device as coffee grounds but is inserted in a holder in the form of a coffee pad, that is, in compacted form surrounded by filter paper. The holder with a holder cover via which water is supplied can form a sealed pressure chamber. At the same time, the holder for the coffee pads is allocated a plurality of functions.

Firstly, the holders provides a sealing surface so that a pressure chamber can be formed. Moreover, the holder has an outlet opening from which the coffee can emerge. Furthermore, the coffee pad should be mounted in the holder in a manner such that flow through the coffee pad is not impeded. Such a coffee machine occupies an intermediate position between a conventional pressureless coffee machine and an espresso machine.

Coffee machines fitted with a continuous flow heater generally have a thermoblock. In many cases, such a thermoblock consists of cast aluminium with water-carrying channels being formed inside the block. Particularly controlled heating of the water can be achieved with a thermoblock, both with regard to the evolution of steam and the constant nature of the coffee temperature. However, thermoblocks are expensive to manufacture and they require a relatively large mass to store the heat.

Continuous-flow heaters without a thermoblock are cost-effective but have some disadvantages when operated with coffee pads, should the hot coffee be required to be available immediately in a short time at a specific temperature and the time sequence for a cup is very short.

The disadvantages include uncontrolled evolution of steam with corresponding excess pressure, and a high dependence of the coffee outlet temperature on factors such as water temperature in the tank, ambient temperature, mains voltage fluctuations and tolerances of the heater.

It is the object of the invention to provide a method and an electronic control device on the basis of which a coffee machine can also be operated satisfactorily without a thermoblock.

BRIEF SUMMARY OF THE INVENTION

The invention relates to a method for controlling heating processes in a coffee machine, which is particularly suitable for preparing coffee using coffee pads, wherein the coffee machine comprises a continuous flow heater and a pump for conveying water through the continuous flow heater comprising the steps: measuring a temperature in the area of the continuous flow heater and/or the water conveyed by the pump and influencing the amount of water conveyed by the pump depending on the temperature. In this way, the disadvantages which can arise as a result of using a continuous flow heater without a thermoblock are compensated. By supplying the amount of water conveyed by the pump in a metered manner depending on the temperature, any uncontrolled evolution of steam, particularly as a result of local temperature differences, and the high dependence of the coffee outlet temperature on ambient conditions can be eliminated.

It is usefully provided that a temperature is measured between the continuous flow heater and the brewing chamber and this temperature is taken into account when influencing the amount of water conveyed by the pump or the heating power. A temperature measurement between the continuous flow heater and a brewing chamber provides a direct reference point for the temperature of the water supplied to the brewing chamber. Consequently it is useful to take this temperature into account when influencing the heating power and amount of water.

However, it can also be useful if a temperature is measured between the pump and the continuous flow heater and this temperature is taken into account when influencing the amount of water conveyed by the pump or the heating power. Influencing the heating power or the amount of water conveyed depending on the temperature before the continuous flow heater particularly advantageously influences the operating mode of the continuous flow heater, for example, with regard to the evolution of steam or any overheating.

It can also be advantageous that the temperature difference is measured between an inlet to the continuous flow heater and an outlet from the continuous flow heater and this temperature is taken into account when influencing the amount of water conveyed by the pump or the heating power. This temperature difference provides a good measure for the heating power of the continuous flow heater in relation to the amount of water conveyed.

It is preferable if the amount of water conveyed by the pump is influenced by a pulsed operation of the pump. The pulsed operation can have the effect that no steam overpressure occurs and the water having a sufficiently high temperature is still provided from the beginning of the brewing process.

The method according to the invention is advantageously further developed in that the pump is switched on before the beginning of heating and is operated with a first cycle ratio between switch-on time and switch-off time, that the cycle ratio becomes larger with increasing temperature and that the cycle ratio is 1 above a predefined temperature threshold. In this way, overheating and steam overpressure is avoided. Furthermore, water at the same temperature can be supplied in almost every phase of the brewing process. Switching on the pump before the beginning of heating avoids the continuous flow heater being operated without being filled with water.

It is furthermore useful that in addition to influencing the amount of water conveyed by the pump, the heating power is influenced depending on the temperature in the area of the continuous-flow heater. The temperature measured in the area of the continuous flow heater can thus be used both with regard to influencing the amount of water conveyed by the pump and also with regard to influencing the heating power of the continuous flow heater.

The invention builds on a generic electronic control device whereby the electronic control device comprises means for influencing the amount of water conveyed by the pump depending on the temperature measured by the temperature sensor. In this way, the advantages and particular features of the method according to the invention are also implemented within the framework of an electronic control device. This also applies to the particularly preferred embodiments of this device.

In this sense it is preferred that the means are formed by clocked operation of the pump.

It can also be provided that the means are constructed for varying the flow resistance. The heating processes in the continuous flow heater can also advantageously be influenced hereby.

This can be effected, for example, by the means for varying the flow resistance comprising a restrictor.

At the same time, it can be provided that the restrictor is constructed as a slider disposed in the conveying section. This is a particularly simple possibility for implementing a restrictor.

It can likewise be usefully provided that in addition to influencing the amount of water conveyed by the pump, means are also provided for influencing the heating power depending on the temperature. Thus, largely independent quantities, namely the conveyed amount of water and the heating power, can be influenced depending on the temperature.

The influencing of the heating power can also be further developed such that the means for influencing the heating power comprise a controller for switching different numbers of a plurality of heaters of the continuous flow heater. In the preferred embodiment of the continuous flow heater, this is equipped with two opposite heating rods so that it is possible to selectively supply voltage to the heating rods to influence the heating power.

The electronic control device according to the invention is advantageously further developed in that the temperature sensor is arranged in a water-guiding section between the continuous flow heater and a brewing chamber. The measurement of the temperature directly before the brewing chamber is a useful requirement for providing a satisfactory brewing result.

Additionally or alternatively, it can also be advantageous that at least one temperature sensor is arranged on the conveying section and/or in the water-guiding section. As a result of this additional information, the operation of the continuous flow heater can be optimised.

It can also be provided that at least one temperature sensor is disposed directly on a heater of the continuous flow heater. The direct measurement of the heater temperature thereby made possible allows the controller to respond rapidly.

The electronic control device according to the invention can also be further developed in that a temperature sensor is arranged between the pump and the continuous flow heater and the temperature measured by this temperature sensor is taken into account when influencing the amount of water conveyed by the pump or the heating power. By knowing the temperature of the water before the continuous flow heater, the amount of water conveyed into the continuous flow heater or the heating power provided by the continuous flow heater can advantageously be influenced particularly with regard to the operation of the continuous flow heater but also with regard to the water temperature to be achieved in the brewing chamber.

The advantageous arrangement of the temperature sensor can also be characterised in that a temperature sensor is located upstream of the continuous flow heater in the flow direction of the water.

In the same sense, it can be formulated that a temperature sensor is located downstream of the continuous flow heater in the flow direction of the water.

Furthermore, it can be useful that the electronic control device comprises a differential element for determining the temperature difference between a temperature measured by a temperature sensor located upstream of the continuous flow heater and a temperature measured by a temperature sensor located downstream of the continuous flow heater for influencing the amount of water conveyed by the pump. The difference between these measured temperatures can give a reliable indication of the processes in the continuous flow heater without being influenced by processes before or after the continuous flow heater.

The invention is based on the finding that a coffee machine with a continuous flow heater without a thermoblock can be operated reliably by an electronic controller compensating for the disadvantages arising from the lack of a thermoblock. In particular, excessive generation of steam and temperature fluctuations are eliminated by control processes.

In a further controller according to the invention, the aforesaid disadvantages are compensated or even completely eliminated by the following process steps or functions of the electronics.

In pumping mode after starting a brewing process, the pump is switched on before or with the heater in order to avoid the heater operating without being filled with water. In order to rapidly reach the required high brewing temperature, the pump is then switched in a specific ON/OFF cycle so that no steam overpressure occurs.

The method is designed so that the pump only conveys fully without interruption when a sensor or regulator on the heater indicates that a certain temperature is reached.

The pumping cycle ratio and/or the heating power is modified or adapted using a sensor in the water outlet between the heater and the brewing chamber.

A sensor can also be provided in the water inlet which likewise influences the pumping cycle ratio and/or the heating power.

The electronics can also control the length of the brewing process according to the number of cups selected.

A third steam identification means is provided to prevent any overheating of the heater. The following process steps are proposed according to the invention to prevent any overheating of the heater:

If a temperature higher than 90 to 100° C. is present at the temperature sensor for longer than about 3 to 5 sec, the electronics switches the heater off until the temperature has fallen to a value below 70 to 90° C. If the pump is switched off shortly before the end of the coffee delivery time, the pump runs for a further 3 to 6 sec to avoid any increased steam formation during overheating.

Should the sensor have a defect or be incorrectly connected or not connected at all, the electronics identifies this error and will not allow the device to start.

The process sequence of the preferably electronic control is as follows:

When starting the coffee delivery, the pump starts up for a short time in a starting phase to fill the heater which may be empty. The pump then stops conveying whilst the heater heats the water. When a temperature of about 70 to 80° C. is reached at the sensor, the pump is switched on and conveys the hot water from the heater at up to 120° C. When the temperature at the sensor falls below about 80 to 90° C. again, the pump is switched off again.

When the pump is stopped in the conveying phase following the starting phase, the water in the heater is heated again and at a temperature of about 80 to 95° C., the pump switches on again and switches off below about 75 to 95° C. The pump continues to cycle within these temperature limits until the coffee delivery time for one or two cups has expired.

The heater is then switched off in a final phase about 1-3 sec before the end of the coffee delivery time or the pump continues to run to reduce the formation of steam as a result of the afterheat.

The advantage of this method according to the invention is that a more cost-effective continuous flow heater can be used. The brewing process begins immediately after selecting the cups and no evolution of steam with undesirable overpressure in the heating circuit occurs.

BRIEF DESCRIPTION OF THE DRAWINGS

The invention is now explained with reference to the accompanying drawings using particularly preferred embodiments as an example. In the figures.

In the following description of the drawings, the same reference numerals denote the same or comparable components.

DETAILED DESCRIPTION OF EXEMPLARY EMBODIMENTS OF THE PRESENT INVENTION

Figure 1:
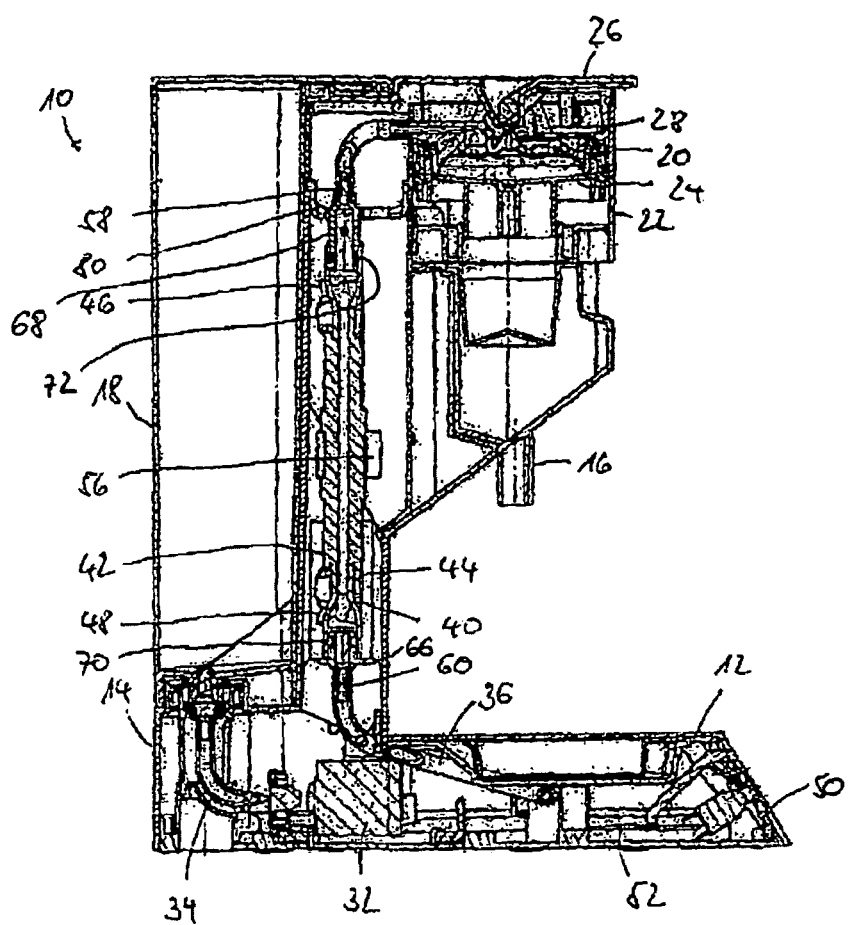
FIG. 1 is a sectional view of a coffee machine to explain the invention.
Figure 2:
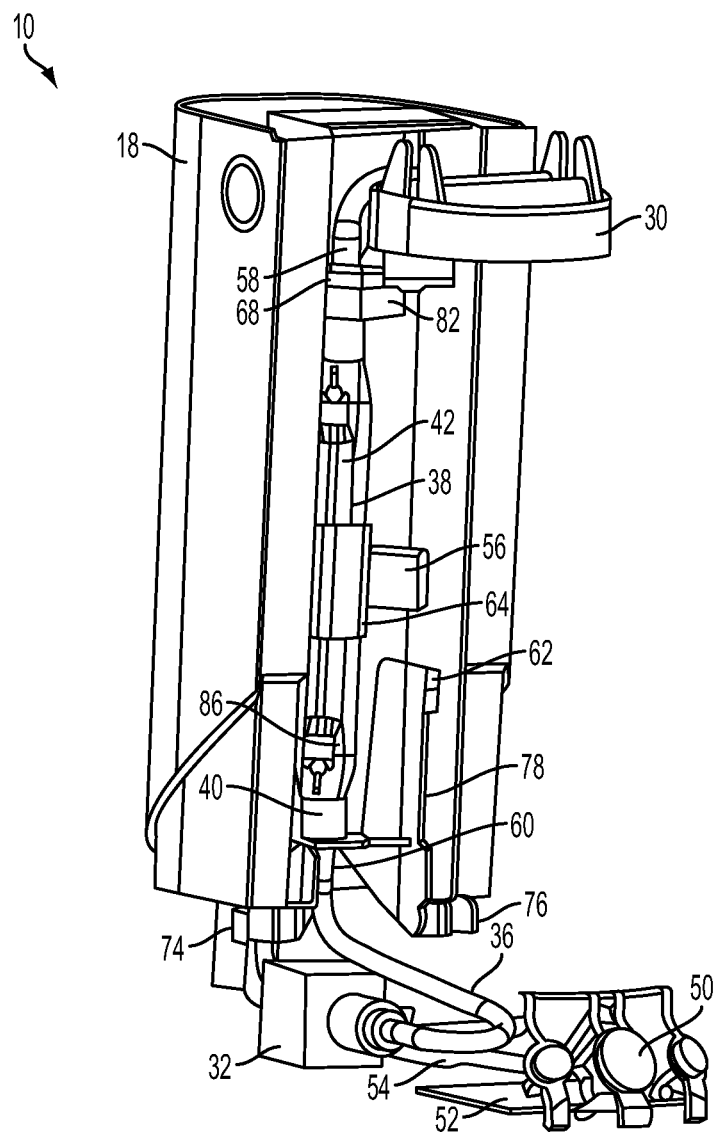
FIG. 2 is a perspective view of a housing part and components located in the housing to explain the invention.

FIG. 1 shows a sectional view of a coffee machine to explain the invention. FIG. 2 shows a perspective view of a housing part and components located in the housing to explain the present invention. The coffee machine 10 comprises a flat front portion 12 and a columnar rear assembly 14. Cups for removing coffee via an outlet 16 can be arranged on the front portion 12. A water container 18 is inserted in the rear assembly 14. The rear assembly 14 further comprises a brewing chamber 20 which is formed by a coffee pad holder 24 which can be supplied with a drawer and an elastic holder cover 28 as the brewing chamber upper portion 30. In order to seal the coffee pad holder 24 and the holder cover 28 with respect to one another after pushing in the drawer 22, a lever mechanism is provided with a lever 26. In the state shown the lever mechanism is pulling the coffee pad holder 24 against the holder cover 28. If the lever 26 is thrown backwards through 90°, the coffee pad holder 24 is lowered so that it can be removed together with the drawer 22 from the coffee machine 10.

Provided inside the housing formed by the front portion 12 and the rear assembly 14 are components for conveying water, for heating water and for controlling these processes. Located in the lower housing area at the boundary between the front portion 12 and the rear assembly 14 is a pump 32 to which water is supplied from the water container 18 via a hose 34. The pump 32 is connected to a continuous flow heater 38 at its inlet 88 by means of a further hose 36. A hose 92 can be plugged onto the continuous flow heater 38 at its outlet 90 in a comparable manner. Important components of this continuous flow heater 38 are a pipe 40 used to carry water, providing a conveying section 84, and two heating rods 42, 44. The heating rods 42, 44 each have two electrical connections 46, 48 to which the heating voltage is applied. It can furthermore be provided that a restrictor 86 embodied as a slider is provided with an electrical connection in order to thus influence the amount of water conveyed through the continuous flow heater. Provided on the front portion 12 of the coffee machine 10 is a keypad 50 which is connected to a printed circuit board 52, said printed circuit board 52 preferably controlling all the functions of the coffee machine, especially the functions with regard to the conveyance and heating of the water. Starting from the printed circuit board 52 there is provided a cable run 54 which combines the electrical leads via which the electronic controller delivers its control commands and receives input information. This input information particularly relates to the temperature of the continuous flow heater detected by a temperature sensor 56 and preferably further temperature information which is recorded by temperature sensors at measuring points 58 downstream or upstream from the continuous flow heater 38 in the direction of flow. A reed switch 62 is further provided in the rear assembly 14. The task of the reed switch 62 is to electrically detect a minimum filling level in the water container 18. For this purpose a float comprising a magnet is located vertically displaceably in the water container 18. When the water falls below a minimum filling volume in the water container 18, the magnetic float is located near to the reed switch 22 and makes this switch on, closing a circuit which transmits a signal to the electronic controller that the level has fallen below. If the level in the water container is lower than the minimum filling volume, the coffee machine cannot be operated. The continuous flow heater 38 can also have a sensor which prevents any running dry during the heating process.

The pipe 60 of the continuous flow heater 38 is flattened in the area in which the heating rods 42, 44 abut against the pipe 60. If the heating rods are correspondingly designed likewise with a flat side, good contact and consequently good heat transfer can be accomplished between the heating rods 42, 44 and the pipe 60. The arrangement of pipe 60 and heating rods 42, 44 is held together by a sleeve 64 which can be made of heat-resistant plastic or metal. The temperature sensor 56 is located in the area of this sleeve 64. Hose connectors 66, 68 are attached to the ends of the pipe 60. In the present exemplary embodiment, these are inserted in the pipe 60 and fitted with a circumferential seal 70, 72, for example, an O-ring. Fixing means 74, 76, 78, 80 are moulded onto the hose connectors 66, 68 made of heat-resistant plastic, only some of the fixing means being identified with reference numerals as an example here. These fixing means 74, 76, 78, 80 are used to fix and centre the continuous flow heater 38 in the housing and also to receive additional components, for example, to receive the reed switch 62 in the fixing means 78. A safety valve 82 is furthermore built into the hose connector 68. The continuous flow heater 38 can thus be mounted as a unit with the hose connectors 66, 68 and the hoses placed thereon and can easily be inserted in the housing as a result of centring properties.

Figure 3:
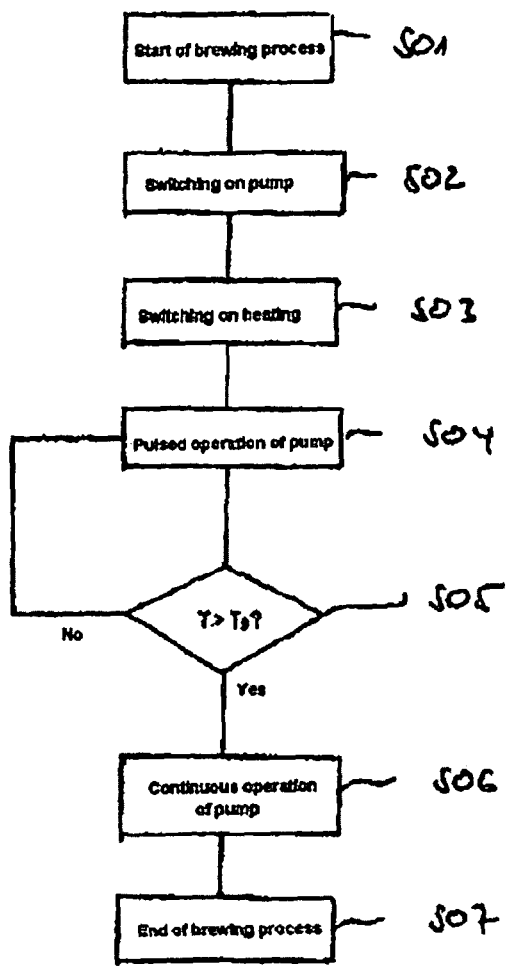
FIG. 3 is a flow diagram to explain a method according to the invention.

FIG. 3 shows a flow diagram to explain a method according to the invention. After starting the brewing process in step S01, the pump 32 is switched on in step S02 so that water is conveyed into the pipe 40 of the continuous flow heater 38. Subsequently, in step S03 the heating voltage is applied to the heating rods 42, 44. This sequence of steps S02 and S03 ensures that the heater is not operated when dry. However, it can also be appropriate to switch on the heater immediately after starting the brewing process and only switch on the pump 32 after a pre-heating period. By this means heating may possibly take place when the continuous flow heater 38 is dry but in return, high water temperatures are already achieved at the onset of conveyance. The problem of the continuous flow heater running when dry can be counteracted by providing sensors to protect against running dry. These can either be designed as moisture sensors so that it can be ensured that in the event of running dry, the heating power is shut down or the pump 32 is switched on. Such a sensor can also operate on a temperature basis so that when a specific temperature is reached at the continuous flow heater, the pump 32 is switched on in any case. In step S04 the pump 32 now goes over into pulsed operation in order to thus avoid local overheating and resulting undesirable steam overpressure on the one hand and on the other hand, to convey an amount of water appropriate to the available heating capacity. In step S05 it is checked whether a temperature threshold $T_s$ is achieved at the continuous flow heater 38. If this is not the case, the pump 32 remains in pulsed mode, wherein however the cycle ratio can be varied in favour of the switch-on time with increasing temperature. Only when it is determined in step S05 that a threshold temperature $T_s$ is reached at the continuous flow heater 38, does the pump 32 operate continuously in step S06. After removing the coffee, the brewing process ends in step S07.

The checking of the temperature according to step S05 can in particular be further developed by setting a plurality of temperature thresholds and by varying the cycle ratio of the pump in favour of the switch-on time whenever a next temperature threshold is exceeded. It is also possible to vary the cycle ratio continuously. Other temperature information which is determined in particular at the measuring points 58, 60 before and after the continuous flow heater 38 can also be used when checking the temperatures.

Figure 4:
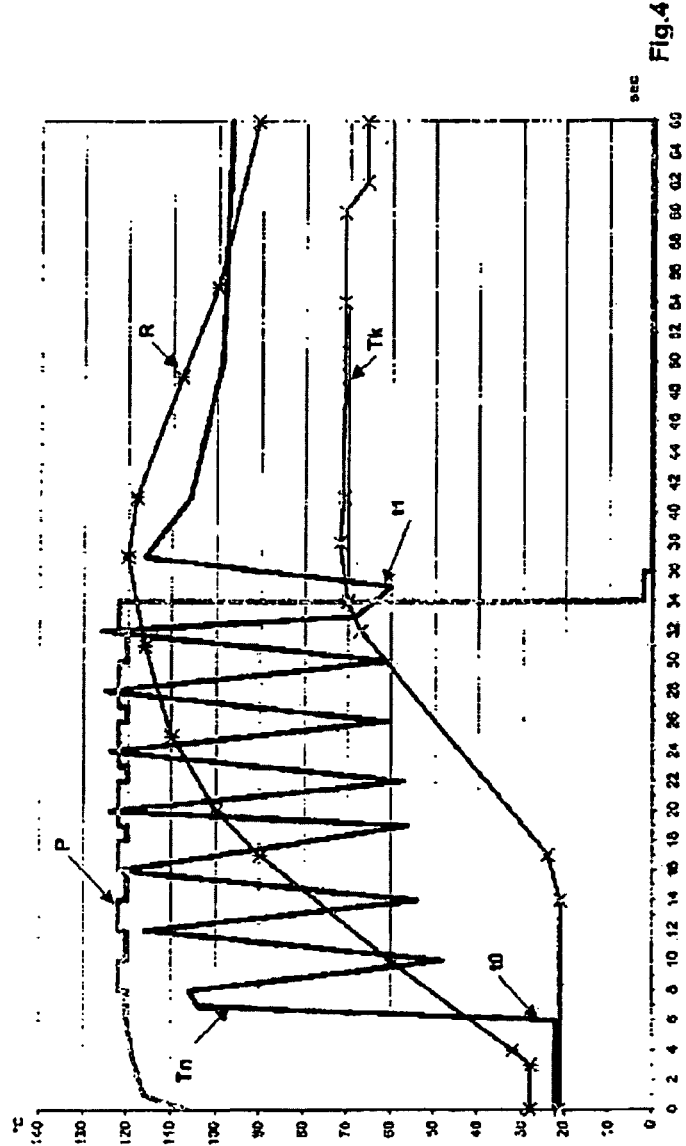
FIG. 4 is a function diagram of a pulsed heating power controller to avoid or prevent steam formation.

The function diagram shown in FIG. 4 shows the time profiles when filling a cup of coffee from a coffee pad machine according to the invention comprising a 1800 W tubular heater of length 180 mm and diameter 16 mm with a heating tube wall thickness of 1.5 mm. A commercially available NTC is used as the sensor. The filling process includes a lead time and a afterrun time of one second each. The graph designated by Tn shows the time behaviour of the temperature at the NTC sensor. The graph designated by Tk shows the time behaviour of the coffee and the graph designated by R shows the time behaviour of the temperature at the controller lug. The graph designated by P shows the time behaviour of the heating power introduced into the tubular heater. The time designated by t0 indicates the beginning of conveyance of water by switching on the pump. The time designated by t1 indicates the end of conveyance by switching off the pump.

The features of the invention disclosed in the preceding description, in the drawings and in the claims can be important for implementing the invention both individually and in any combination.

REFERENCE LIST

10 Coffee machine
12 Front portion
14 Rear assembly
16 Outlet
18 Water container
20 Brewing chamber
22 Drawer
24 Coffee pad holder
26 Lever
28 Holder cover
30 Brewing chamber upper portion
32 Pump
34 Hose
36 Hose
38 Continuous flow heater
40 Pipe
42 Heating rod, heater
44 Heating rod, heater
46 Electrical connection
48 Electrical connection
50 Keypad
52 Printed circuit board
54 Cable run
56 Temperature sensor
58 Measuring point, temperature sensor
60 Measuring point, temperature sensor
62 Reed switch
64 Sleeve
66 Hose connector
68 Hose connector
70 Seal
72 Sea;
74 Fixing means
76 Fixing means
78 Fixing means
80 Fixing means
82 Safety valve
84 Conveying section
86 Restrictor, slider
88 Inlet
90 Inlet
92 Hose

The invention claimed is:

1. A coffee machine for preparing coffee using coffee pads, the coffee machine comprising:
   a brewing chamber;
   a continuous flow heater having an adjustable heating power;
   a pump for conveying water along a conveying section through the continuous flow heater to the brewing chamber;
   a plurality of temperature sensor sensors including a first temperature sensor disposed between the continuous flow heater and the brewing chamber, and a second temperature sensor disposed between the pump and the continuous flow heater; and
   an electronic control device including means for controlling production of steam in the continuous flow heater by influencing an amount of water conveyed by the pump in response to temperatures measured by the first and second temperature sensors,
   the electronic control device programmed to:
   switch the pump ON continuously such that the water is conveyed through the continuous flow heater to the brewing chamber;

switch the continuous flow heater ON after switching the pump ON;

measure a first temperature between the continuous flow heater and a brewing chamber with the first temperature sensor;

after the switching the pump ON and the switching the continuous flow heater ON, control the production of the steam and the pressure in the continuous flow heater by:

performing a pulsed operation of the pump, which includes switching the pump ON and OFF in an ON/OFF cycle ratio between switch-on time and switch-off time, when the first temperature of the water between the continuous flow heater and the brewing chamber is less than a predefined temperature threshold for optimum brewing; and repeating the pulsed operation of the pump when the first temperature of the water between the continuous flow heater and the brewing chamber is less than the predefined temperature threshold; and after performing the pulsed operation of the pump and repeating the pulsed operation of the pump, switch the pump ON continuously such that the water is conveyed through the continuous flow heater to the brewing chamber when the first temperature of the water between the continuous flow heater and the brewing chamber is greater than the predefined temperature threshold.

2. The coffee machine of claim 1, wherein the means for influencing the amount of water conveyed includes the control device performing a clocked operation of the pump.

3. The coffee machine of claim 1, wherein the means for influencing the amount of water conveyed includes a restrictor.

4. The coffee machine of claim 3, wherein the restrictor includes a slider disposed in the conveying section.

5. The coffee machine of claim 1, wherein the continuous flow heater includes a plurality of heaters and the means for influencing the heating power comprises a controller for switching on different numbers of the plurality of heaters.

6. The coffee machine of claim 1, wherein the electronic control device comprises an electronic control device including a differential element programmed to determine a temperature difference between the first and second temperature sensors.

7. A method for controlling heating processes in a coffee machine, which is suitable for preparing coffee using coffee pads, wherein the coffee machine comprises a brewing chamber, a continuous flow heater having an adjustable heating power, a pump for conveying water through the continuous flow heater to the brewing chamber, a first temperature sensor disposed between the continuous flow heater and the brewing chamber, and an electronic control device for controlling production of steam and pressure in the continuous flow heater, the method comprising:

switching the pump ON continuously such that the water is conveyed through the continuous flow heater to the brewing chamber;

switching the continuous flow heater ON after the switching the pump ON;

measuring a first temperature between the continuous flow heater and the brewing chamber with the first temperature sensor;

after the switching the pump ON and the switching the continuous flow heater ON, controlling the production of the steam and the pressure in the continuous flow heater by influencing an amount of the water conveyed by the pump in response to the measured first temperature, wherein influencing the amount of the water includes:

performing a pulsed operation of the pump when the first temperature of the water is less than a predefined temperature threshold for optimum brewing; and repeating the pulsed operation of the pump until the first temperature of the water is equal to the predefined temperature threshold, the pulsed operation including switching the pump ON and OFF in a predetermined ON/OFF cycle; and after the performing the pulsed operation of the pump and the repeating the pulsed operation of the pump, performing a continuous ON operation of the pump when the first temperature of the water is greater than the predefined temperature threshold.

8. The method of claim 7, wherein the controlling the production of the steam in the continuous flow heater further comprises:

influencing an amount of the adjustable heating power of the continuous flow heater.

9. The method of claim 7, wherein the predetermined ON/OFF cycle comprises a first cycle ratio between a switch-on time of the pump during the pulsed operation of the pump and a switch-off time of the pump during the pulsed operation of the pump, the method further comprising increasing the first cycle ratio as the measured first temperature increases.

10. The method of claim 9, wherein the first cycle ratio between the switch-on time of the pump and the switch-off time of the pump, when the first temperature is greater than the predefined temperature threshold, has a ratio of one.

11. The method of claim 7, further comprising: comparing the first temperature to a plurality of successively increasing predefined temperature thresholds, wherein the predetermined ON/OFF cycle comprises a plurality of ON/OFF cycle ratios between a switch-on time of the pump during the pulsed operation of the pump and a switch-off time of the pump during the pulsed operation of the pump, each of the plurality of ON/OFF cycle ratios corresponding to one of the plurality of successively increasing predefined temperature thresholds, wherein each of the plurality of ON/OFF cycle ratios is varied in favor of the switch-on time as the first temperature exceeds each successively increasing predefined temperature threshold of the plurality of successively increasing predefined temperature thresholds.

12. The method of claim 7, wherein the coffee machine further comprises a second temperature sensor disposed between the pump and the continuous flow heater, wherein the method further comprises:

measuring a second temperature between the pump and the continuous flow heater with the third temperature sensor; and determining a temperature differential between the first temperature and the second temperature;

wherein the influencing the amount of the water is adjusted based on the determined temperature differential.

13. The method of claim 7, wherein the coffee machine further comprises a third temperature sensor disposed at the continuous flow heater, wherein the method further comprises measuring a third temperature at the continuous flow heater with the third temperature sensor, and wherein the influencing the amount of the water is adjusted based on the first temperature, the second temperature, and the third temperature measured by the first temperature sensor, the second temperature sensor, and the third temperature sensor, respectively.

14. A method for controlling a heating process in a coffee machine using coffee pads, wherein the coffee machine comprises a brewing chamber, a continuous flow heater having an adjustable heating power, a pump for conveying water through the continuous flow heater to the brewing chamber, a first temperature sensor disposed between the continuous flow heater and the brewing chamber, and an electronic control device for controlling production of steam in the continuous flow heater, the method comprising:

switching the pump ON continuously such that the water is conveyed through the continuous flow heater to the brewing chamber;

switching the continuous flow heater ON after the switching the pump ON;

measuring a first temperature between the continuous flow heater and a brewing chamber with the first temperature sensor;

after the switching the pump ON and the switching the continuous flow heater ON, controlling the production of the steam and the pressure in the continuous flow heater by:

performing a pulsed operation of the pump, which includes switching the pump ON and OFF in an ON/OFF cycle ratio between switch-on time and switch-off time, when the first temperature of the water between the continuous flow heater and the brewing chamber is less than a predefined temperature threshold for optimum brewing; and repeating the pulsed operation of the pump when the first temperature of the water between the continuous flow heater and the brewing chamber is less than the predefined temperature threshold, and increasing the ON/OFF cycle ratio as the second temperature increases; and after performing the pulsed operation of the pump and the repeating the pulsed operation of the pump, switching the pump ON continuously such that the water is conveyed through the continuous flow heater to the brewing chamber when the first temperature of the water between the continuous flow heater and the brewing chamber is greater than the predefined temperature threshold.

* * * * *

UNITED STATES PATENT AND TRADEMARK OFFICE
CERTIFICATE OF CORRECTION

PATENT NO.        : 8,418,601 B2                                                      Page 1 of 1
APPLICATION NO. : 10/586693
DATED             : April 16, 2013
INVENTOR(S)       : Magg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1436 days.

Signed and Sealed this
First Day of September, 2015

Michelle K. Lee
*Director of the United States Patent and Trademark Office*